July 22, 1952  
C. A. HAHN  
PROJECTION LIGHT SOURCE AND LIGHT BEAM MODIFIER COMBINATION  
2,604,005  
Filed Jan. 21, 1949  
3 Sheets-Sheet 1
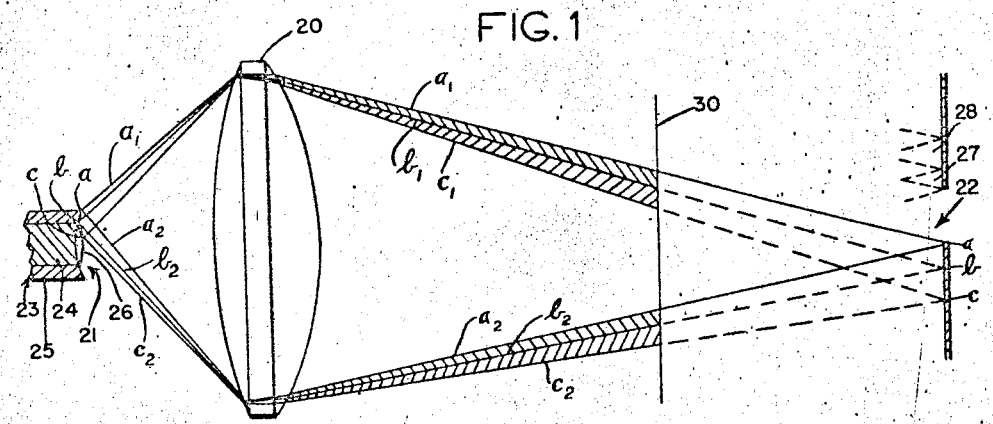
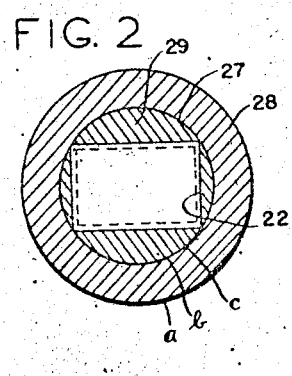
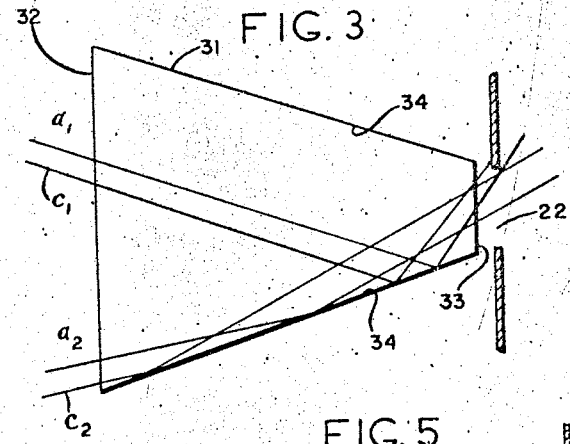
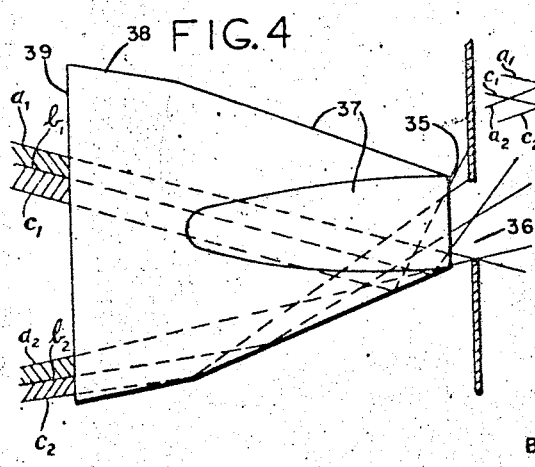
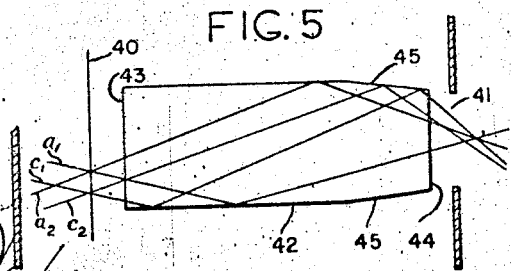
INVENTOR  
CHARLES A. HAHN  
BY  
ATTORNEYS

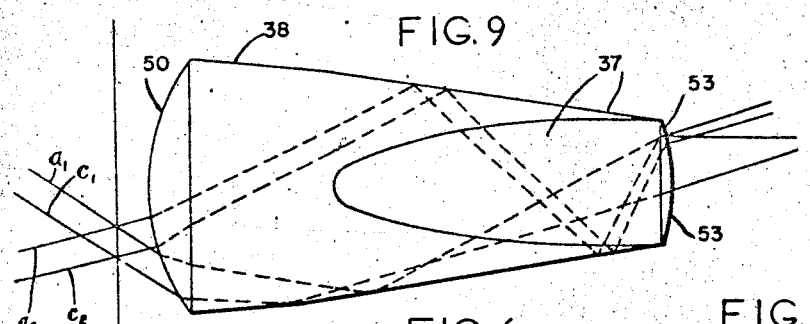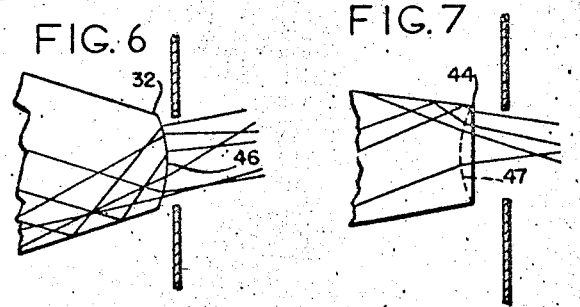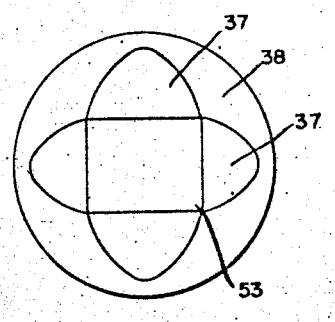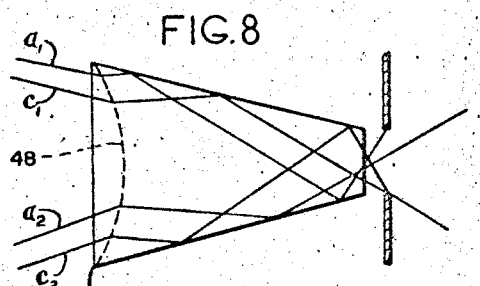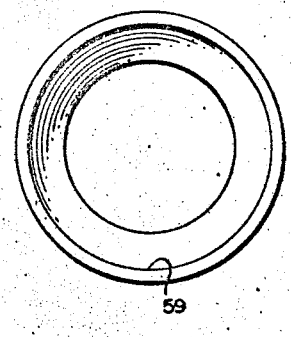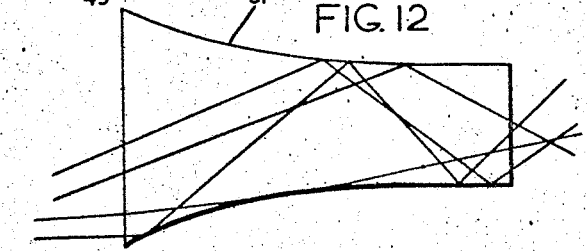

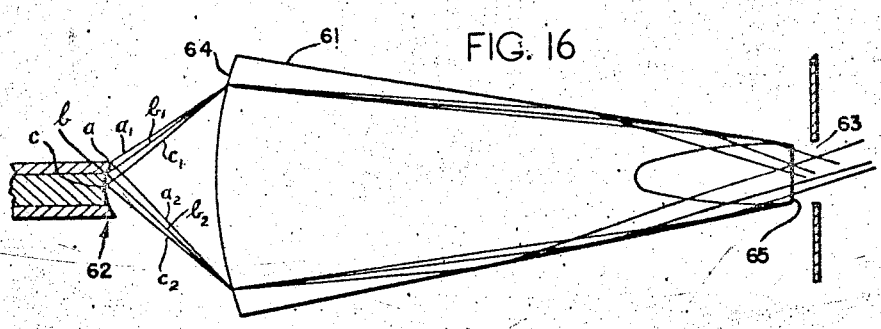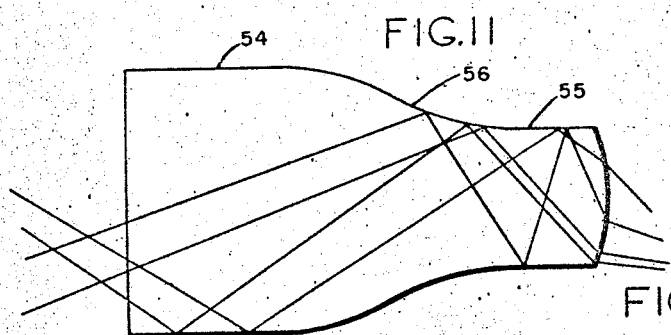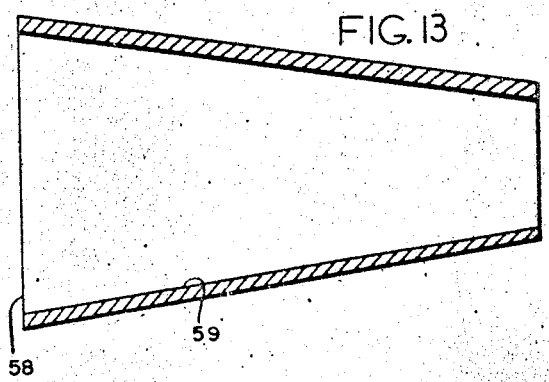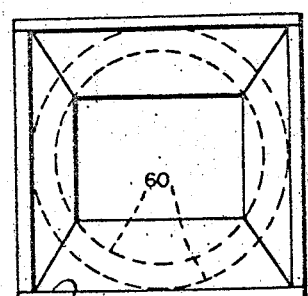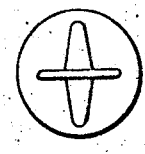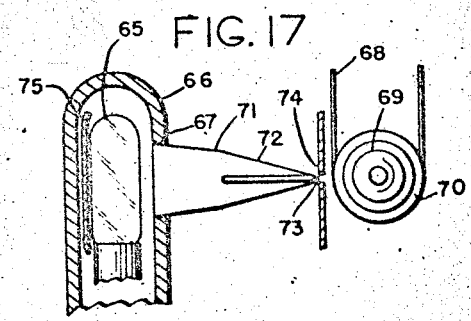

Patented July 22, 1952

2,604,005

UNITED STATES PATENT OFFICE 2,604,005

PROJECTION LIGHT SOURCE AND LIGHT BEAM MODIFIER COMBINATION

Charles A. Hahn, Chicago, Ill.

Application January 21, 1949, Serial No. 71,981

4 Claims. (Cl. 88—24)

This invention relates to devices for use with light beams having characteristics of cross sectional non-uniformity, by means of which such characteristic can be eliminated, and the light beam made substantially uniform throughout its cross section.

An example of a light beam having a non-uniform cross section is the beam produced by a system comprising a high intensity arc lamp and a collector such as a condensing lens or reflector, focussed to produce an image at a plane spaced from the collector. The light emitting source of a high intensity arc comprises the positive carbon crater, and, as will later be set forth in greater detail, the light emitted throughout the area of the crater is not uniform. The light emitting area of the crater comprises a central circular portion of quite uniform, intense white light and a surrounding annular area that emits light of different intensity from that of the central area, that is non-uniform in that its intensity diminishes as the outer edge of the area is approached, and contains a much higher percentage of light of the shorter wave lengths than does the light from the central area. Thus the high intensity arc source emits light having different characteristics of both intensity and wave length content. Other sources, such as an incandescent filament, do not have such markedly differing and sharply defined areas, but in general have central areas emitting quite uniform light, and surrounding areas that emit light that diminishes in intensity toward the outer margins of the source.

In projecting transparencies, such as motion pictures or slides, it is conventional practice to so focus the collecting device as to produce at or near an aperture an image of the light source sufficiently enlarged that the image of the central area of uniform illumination of the light source covers the aperture, thereby illuminating it with substantial uniformity throughout its area, while the part of the image formed by light that emanates from the other area of the source falls on the structure surrounding the area, and is thereby masked from the projection lens. This practice of masking out unwanted or unusable parts of an image of the light source, and projecting the remainder of the image onto a screen serves to illuminate such screen with satisfactory uniformity, but involves the waste of a large percentage of the light content of the beam at the aperture.

The present invention provides means whereby instead of masking from the projection lens the unwanted or unusable portions of the light beam, such portions are by reflection redirected, so as to pass through the aperture with such distribution of their light content throughout the aperture area as to avoid formation of an image of the part of the light source from which they are emitted. In this way salvaging is accomplished of a large part of the light that is wasted by the conventional practice of masking out part of the image, while the nonuniform illumination of the aperture that results from registering with the aperture a complete image of the source, is avoided.

The invention presents the additional advantage of providing ready reshaping of the cross section of the beam, so it can be matched with an aperture of a shape different from that of the source, as when an arc lamp is used to illuminate a rectangular projection aperture.

A primary object of the invention is the provision of a device for use with a light beam of nonuniform cross section, whereby a portion of the beam having a characteristic that differs from that of another part is redirected into the path of such other part.

Another object is the provision of a device for use with a light beam focussed to form an image of a light source having a nonuniform light emitting area, which will intercept a part of the beam having light focussed to form a part of an image having an illuminating characteristic different from that of another part, and redirected such light into the path of another part of the beam focussed to form such part of the image.

Another object is the provision of such a device that will modify a light beam of nonuniform cross section, to produce a light beam of substantially uniform cross section.

An additional object of the invention is to provide a light beam modifying device capable of changing either or both the cross sectional size and shape of a light beam to produce a beam of desired size and shape containing in substantially uniform distribution a large percentage of the light content of the original beam.

A further object is the provision of a light beam modifier that so directs the light rays in the modified beam as to reduce the $f$-speed requirements of projection lenses, as compared to those used in conventional systems to project part of an image of a light source.

Still another object is the provision of a light beam modifier of sufficiently low cost to accomplish a substantial saving in expense as compared to optical systems of standard arrangement.

In the accompanying drawings:

Fig. 1 is a schematic side elevation of an optical system, a high intensity arc light source and an aperture, indicating the mode of operation of the invention.

Fig. 2 is a schematic showing of an aperture, also indicating the mode of operation of the invention.

Fig. 3 is a schematic view of the invention.

Fig. 4 is a side elevation of a form of the invention.

Figs. 5 to 9 and 10 to 12 are generally schematic views showing various forms that the invention may take.

Fig. 10 is an end elevation of the form of device shown in Fig. 9.

Fig. 13 is a longitudinal section of a modified form of the invention.

Figs. 14 and 15 are end elevations of devices constructed in accordance with Fig. 13.

Fig. 16 is a diagrammatic illustration of an extreme form of the invention.

Fig. 17 is a sectional view showing application of the invention to the exciter optical system of a sound motion picture assembly.

Fig. 18 is an end elevation of the form of the invention shown in Fig. 17.

Describing the drawings in detail and first referring to Fig. 1 and Fig. 2, a collector, shown as a condenser lens 20, is arranged to collect light from a high intensity positive arc carbon crater 21, and is focussed to produce an image of the crater at the plane of the entrance side of a rectangular aperture 22. The positive arc carbon 23 comprises a core 24 of flame-producing material and a surrounding sheath 25 of current-conducting material such as copper coated carbon. A so called "flame," comprising a body 26 of incandescent gas is formed in the crater, and this body of gas comprises the area of the source emitting high intensity and substantially uniform light. In the drawing the "tail" of the flame, which streams upward from the body 26 has been omitted for clarity. For exactness, it may be understood that light emitted by the "tail" is treated in the same way as other light proceeding from areas outside that of the gas body 26.

The core material used for the positive carbon in transparency projection normally is such that the gas body 26 emits a large percentage of light of wave lengths that range through the middle part of the visible spectrum, so appears white. The light emitted by the carbon sheath has a high percentage of the shorter wave lengths of the visible spectrum. The total light emitted by the high intensity arc includes wave lengths ranging throughout the visible spectrum from about 3100 to 7500 angstrom units. As indicated, the light emitted from the carbon sheath differs in percentage content of wave lengths and intensity from that emitted by the flame, and when a collecting device is focussed to form an image of the source, such light forms a generally conical sheath about a conical core of light emitted by the flame.

Referring to Fig. 2 it will be seen that the focus of the condenser 20 is such as to direct the light to form an image including a circular central part 27 that is an image of the flame 26, sufficiently enlarged to extend to the corners of the aperture 22, and an annular image 28 of the end of the carbon sheath 25. Due to the difference in shape between the circular gas body 26 and the rectangular aperture 22, and the necessity of extending the area 27 to the corners of the aperture, segments 29 of the area fall on the structure surrounding the aperture.

In Figs. 1 and 2, the corresponding outer margins of the carbon 25 and image are designated $a$, those of the flame 26 and central area 27 of the $a$, and the inner, straight margins of the image $b$, and the inner, straight margins of the segments 29 $c$. The lines $a_1$, $a_2$; $b_1$, $b_2$; $c_1$ and $c_2$, represent paths of laterally extreme light rays emitted at the corresponding margins of the source and focussed by the lens 20 to form the image margins. The shading between the light ray paths of Fig. 1 corresponds to that of the areas of the image, Fig. 2, on which falls the light travelling between such paths.

The invention comprises a device for intercepting the light emanating from the area of the source between margins $a$ and $b$, and redirecting such light to fall within the area of the aperture 22. As will later appear, the shape of the beam also is so modified, by intercepting the light emanating from the segmental areas of the source between margins $b$ and $c$ and redirecting it into the rectangular area enclosed by margin $c$ of the image, and so a large part of the light that is lost by the conventional practice of masking out light emanating from the source area bounded by margins $c$ and $a$ is salvaged by being directed through the aperture. This light is so redirected as to distribute it throughout the area of the aperture, so that its non-uniform character is lost, and its addition to the light produced by the flame does not render the total beam appreciably non-uniform, but does increase its intensity.

Redirection of the annular part of the light beam between ray paths $a_1$ and $b_1$, and $a_2$ and $b_2$, is accomplished by interposing in the path of such light, reflecting surfaces disposed at a location ahead of the aperture, as between it and a transverse plane 30, and arranged at such angles as to direct the light toward the aperture.

In Fig. 3 the device comprises an elongated light transmitting structure 31 having an entrance end 32, which may be circular and of a diameter to be slightly larger than the light beam at the plane 30 wherein such end lies, and an exit end 33 approximately matching the size of the aperture 22. Between the two ends extend surfaces 34, which are highly internally reflective. The angular relation of the surfaces 34 to the light paths that they intercept are such as to redirect the light between paths $a_1$ and $b_1$ and $a_2$ and $b_2$, toward the aperture 22.

The schematic illustration of the mode of operation of the invention, Fig. 3, does not disclose modification of the shape of the beam to match it to a rectangular aperture. Provision for such modification of the cross sectional shape of the beam is disclosed by Fig. 4, wherein the device comprises a body of transparent material the exit end 35 of which is rectangular and matches the shape and approximately the size of the rectangular aperture 36. From the respective straight sides of the rectangular exit end 35, flat surfaces 37 extend, inclined outwardly and rearwardly to merge with a generally conical surface 38 that tapers forwardly and inwardly from the entrance end 39.

The material of which the body is formed has a characteristic of high internal surface reflection, which may be improved, or provided by an external coating of reflecting material, as silver, applied to surfaces 37 and 38. These reflecting surfaces, as indicated by the light ray paths $a_1$, etc. redirect light that is by the condenser 20 directed to form parts of an image lying outside the aperture 36, to emerge from the rectangular exit end 35 of the device. The flat surfaces 37 shape the beam to match the rectangular form of the aperture, and a large part of the redirected light passes through the aperture.

Figs. 3 and 4, for purposes of comparison with Fig. 1 and with the conventional practice of masking out an unwanted portion of an enlarged image of the light source, disclose beam modifying devices designed for use with a condenser that focuses the light to form an enlarged image of the light source at the plane of the aperture. It will be seen in each of these figures that, although the light beam is compressed by the modifying device to the size and approximate shape of the aperture, and part of the intercepted light that is reflected to paths extending through the exit ends of the devices passes through the aperture, another part of the light emerges at such angles as to fall outside the aperture, while still other parts of the light emerge at such angles to the axis as to be useless for projection.

The angular dispersion of the light reflected by the intercepting surfaces of the device can be improved in either or both of two general ways. One is to change the angle of the reflected light rays by optical treatment of the beam as it emerges from the exit end of the device; the other is to select the angle of incidence of the intercepted rays on the reflecting surfaces. Various forms of these two general methods can be used, either alone or in a wide variety of combinations selected to produce most desirable results in a given situation.

A method of selecting the angle of incidence of rays on the reflecting surface is by adjustment of the speed angle of the beam by selection of the focal characteristics of the collecting device and of its position relative to the light source. Another is by selection of the angle of the reflecting surfaces of the beam modifying device. Still another is by optical treatment of the beam as it enters the device. These various expedients may be used singly or in any combination.

Fig. 5 shows a device arranged for use with a light beam that is focussed to form a small image of the light source at a plane 40 spaced a substantial distance in advance of the aperture 41. The $f$ speed of the beam, as shown by lines $a_1$, $a_2$; $c_1$, $c_2$, is low as compared to that of the beam of Fig. 1. The modifying device comprises a cylindrical portion 42 extending forward from the entrance end 43, a rectangular exit end 44, and flat surfaces 45 that are inclined outwardly and rearwardly from the exit end sides to merge with the cylindrical surface 42. It will be noted that the angles of incidence of the ray paths represented by the lines $a_1$, etc., on the reflecting surfaces 42 or 44 are such as to direct all of the reflected light to the aperture 41.

Figs. 6 and 7 show optical treatment at the exit ends of the devices of Figs. 3 and 5. In Fig. 6 the exit end 32 of the device is provided with a convex lens surface 46 that serves to alter the highly divergent character of the emerging reflected light of Fig. 3 and direct a much greater percentage of such light through the aperture. In Fig. 7 the sharply converging reflected light emerging from the exit end 44 of Fig. 5 is altered by a concave lens surface 47 to more nearly parallel relation to the axis of the system.

In Fig. 8 the light paths $a_1$, etc., are changed by a concave lens surface 48 at the entrance end 49 of the device, by means of which light between the ray paths $a_1$, $c_1$ and $a_2$, $c_2$, which otherwise would pass direct through the aperture, is diverted to incidence with the reflecting surfaces. In this form of the device, since the rays are made to diverge they are directed to the surfaces adjacent which they enter, rather than crossing to opposite surfaces as in previously described forms. The angles of incidence therefore are very small.

Obviously the light emanating from the area of the source between margins $a$ and $c$ may be optically treated at either or both the entrance and exit ends of a device the configuration of which has been selected for use with a collecting and focussing system designed to produce a beam of low $f$ speed. In Fig. 9 the ray paths $a_1$, etc., are selected to form a small image similar to that of Fig. 4. In order to decrease the angle of incidence of rays in paths $a_1$, $c_2$, a convex lens surface 50 is formed at the entrance end of the device. The rays in paths $a_2$, $c_2$ enter near the vertex of the lens and are not materially deflected. Since the rays in paths $a_2$, $c_2$ are reflected twice, their final angle is quite large, and an optical surface, shown as a convex lens 53, is formed at the exit end to improve their angle of emergence.

Figs. 11 and 12 show a different method of selecting the angles of incidence upon the reflecting surfaces of the rays that are to be reflected. In this form of device the forms of the collector are such that there is a marked difference in the angular relation to the axis of the corresponding rays on opposite sides of the beam, such as $a_1$, $c_1$ and $a_2$ and $c_2$. In order to make the angles of the light paths on the reflecting surfaces as small as possible, instead of a continuous taper, the body may have sections of different diameters, each such section presenting to the light rays that fall on it a reflecting surface extending at an angle to the ray direction much smaller than could be presented by the surfaces of a continuously tapered body. In Fig. 11, the body has rear and forward cylindrical sections 54 and 55, which may be connected by an axially concave section 56. The angular relation between the rays $a_1$, $c_1$ and $a_2$, $c_2$, is such that they fall respectively on surfaces that are not related to them at as large angles as would be presented by corresponding surfaces of a conical body, while the desired redirection of the rays is accomplished. The axial configuration of such a body may be varied widely, and certain sections may even be made divergent in the direction of light travel to provide advantageous angles of incidence. In Fig. 12 the body is shown as having axially concave surfaces 57.

It will be evident that any of the forms of modifying devices described above may be provided with any type of optical surface at its entrance and exit ends, and such surfaces may be arranged in any combination. The term "optical surface" is meant to include either a convex, concave or plane surface.

Figs. 13, 14 and 15 show the light beam modifying device in the form of a tapered tube 58 having a highly reflective internal surface 59. Fig. 14 shows in elevation the entrance end of a tapered tube of circular cross section, and Fig. 15 a similar view of a square tapered tube. In the latter case the entrance end may be sufficiently large to receive the entire beam as indicated by the dotted line 60, and the taper may be such that the annular section of the beam between margins $a$ and $c$ is intercepted by the inclined internal surfaces 59 and directed to the exit end of the tube.

In Fig. 16 the generally conical device 61 constitutes the entire optical system that collects light and directs it to the aperture. It extends from a point adjacent to the source 62 to a point adjacent the aperture 63, and has an optical surface 64 at its entrance end, and a smaller rectangular exit end 65. The optical surface 64 may be designed to direct the extreme light ray paths $a_1$, $a_2$, etc., into incidence with the inclined internal reflecting surfaces at advantageous angles.

Figs. 17 and 18 disclose a quite different use of the device, in the optical system of a film sound pickup. In the system of Fig. 17, an exciter lamp 65 is enclosed by a housing 66 having an opening 67 for passage of a beam of light through a sound track on a film 68 and onto a light sensitive cell 69. The film 68 may be trained about a drum 70, with the sound track overhanging the edge of the drum. Instead of directing a large beam of light onto a mask with a slit aperture to form a long narrow light spot on the film as is conventional, a light beam modifier 71 is interposed between the lamp 65 and sound track. The modifier somewhat resembles that of Fig. 9, but its forward portion is wedge shaped, a pair of its flat sides 72 being inclined inwardly toward the exit end 73 to render the latter extremely narrow and transversely elongated to approximately the width of the sound track, as indicated in the exit end elevation of Fig. 18. By this arrangement, a large part of the light from the exciter lamp 65 is directed into a beam having the cross sectional shape and size required for translating the sound track variations into light variations. The system is much more efficient than prior art arrangements involving formation of a light beam of substantial cross section and masking out a large part of such beam by slit aperture structure. A slit may be used with the modifier if desired, as indicated at 74, Fig. 17. The modifier then will form a beam, containing a high percentage of the light emitted by the lamp, and slightly larger in cross section than the slit. A reflecting surface 75 may be arranged in the housing 66.

Each of the devices disclosed above is based on the concept of intercepting the portions of a light beam that would form parts of an image unusable for proper illumination of an aperture, and by reflection directing such parts of the beam through the aperture in such distribution as to provide a substantially uniform increase in illumination throughout the area of the aperture. Interception may be accomplished either by interposing the reflecting surfaces directly in the path of such light, or by directing such light into incidence with the surfaces. The distribution of the reflected light in the aperture, and the angular relation to the axis of the directions of its travel may be selected by either or both controlling the emerging reflected light by optical means through which the light passes after reflection, or by selection of the angle of incidence of the light on the reflecting surfaces. Such angle may be selected by any or all of, adjustment of the $f$ speed of the beam, by adjustment of the angular position, or of the axial configuration of the reflecting surfaces, or by optical control of the light prior to its reflection.

As stated in the preliminary portion of the description of the invention, the primary purpose of the devices herein disclosed is to reduce the waste of light at the aperture by salvaging a large part of the light lost by masking in conventional practice. The increase in efficiency of aperture illumination is such that a marked increase can be accomplished in the illumination of the aperture by sources of given capacity. A given illumination may also be accomplished by a light source of much lower intensity. Use of light sources of reduced capacity will result in marked decrease in cost of equipment, such as generators, converters, cables and other electrical equipment, and in power consumption and maintenance as well.

It is to be understood that the nature of the invention is such that many variations can be made from the specific forms disclosed above by way of example. The scope of the invention and the protection afforded it are to be determined by the appended claims.

I claim:

1. The combination with an electric arc light source and means for collecting and concentrating light emitted therefrom into a projection beam having a central core of light emitted by the arc flame of said source and a surrounding sheath of light emitted by carbon structure surrounding the flame, of a device for modifying said light beam to a condition of cross-sectional uniformity, said device having an optically clear entrance end axially aligned with said beam and of size and shape to admit said core portion and at least a substantial part of said sheath portion, an optically clear exit end coaxial with and spaced from said entrance end in the direction of beam projection and having a size and shape for passing a substantial portion of said core portion, and a surrounding internally reflective surface between said ends and having throughout its periphery an angular relation to the beam axis for intercepting the light of said sheath portion admitted by said entrance end and redirecting light intercepted by it into said core portion and toward said exit end.

2. The combination with an electric arc light source and means for collecting light emitted by said source into a converging beam having a central conical core portion of light emitted by the arc flame of said source and a surrounding conical sheath of light emitted by carbon structure surrounding said flame, of a light beam modifying device interposed in the beam path in coaxial alignment therewith, said device comprising means surrounding the beam axis and providing an internal reflective surface laterally enclosing a light path having a minimum cross-section of at least two angularly related dimensions substantially equal to the diameter of the beam core portion in the plane of said minimum path cross-section, said device having an optically clear exit end having dimensions at least as great as those of said minimum path cross-section and an optically clear entrance end of size and shape to admit said beam core portion and at least a substantial part of said sheath portion, and said reflective surface interconnecting said ends, being interposed in the path of said sheath portion, and throughout its periphery being inwardly inclined in the direction of said exit end toward the beam path axis at an angle greater than the angle of inclination of the most external rays of said sheath portion admitted by said entrance end.

3. The combination with structure forming an optical aperture of a size for projection of pictures from transparencies, an electric arc light source and means for collecting light emitted by said source and forming it into a beam having a core portion of light emitted by the arc flame of said source and a surrounding sheath portion of light emitted by carbon structure surrounding said flame and for directing said beam along an axis extended through said aperture, of a beam modifying device interposed in the path of said beam, said device having optically clear entrance and exit ends of size, shape and optical characteristics to respectively admit said beam core portion and at least a substantial proportion of said sheath portion, and to direct toward said aperture a part of said core portion of a cross-section substantially matching said aperture in size and shape, said entrance and exit ends respectively being directly exposed to said collecting means and to said aperture, and said device providing an internally reflective surface laterally enclosing between said ends, a portion of a light path that is optically clear between said collecting means and said aperture said reflective surface having a peripheral configuration and an axial angular relation to the beam path axis for intercepting portions of the beam surrounding said core portion part and by reflection directing light that it intercepts into the path of said beam core portion part and toward said exit end.

4. The combination with structure forming an optical aperture, an electric arc light source and means for collecting light emitted by said source and forming it into a beam having a conical core portion of light emitted by the arc flame of said source and directed by said collecting and forming means to have at the plane of said aperture a diameter at least as great as the diagonal of said aperture, of a beam modifying device interposed in the path of said beam, said device having a round optically clear entrance end of a diameter to admit the entire beam, a conical internally reflective surface adjacent said entrance end, an optically clear rectangular exit end registered with said aperture, and plane internally reflective surfaces inclining outwardly from the sides of said exit end toward said entrance end and merging with said conical surface, said internally reflective surfaces being inclined relative to the axis of said beam and with respect to its speed angle to intercept and redirect toward said exit end light directed by said collecting and directing means to fall outside the area of said aperture.

CHARLES A. HAHN.

REFERENCES CITED

The following references are of record in the file of this patent:

UNITED STATES PATENTS

| Number | Name | Date |
|---|---|---|
| 1,191,145 | Baldwin | July 18, 1916 |
| 1,417,089 | Mechau | May 23, 1922 |
| 1,544,836 | Haines | July 7, 1925 |
| 1,573,419 | Pambrun | Feb. 16, 1926 |
| 1,717,234 | Lentini | June 11, 1929 |
| 1,880,414 | Capstaff | Oct. 4, 1932 |
| 2,027,519 | Davis et al. | Jan. 14, 1936 |
| 2,031,971 | Morrissey | Feb. 25, 1936 |
| 2,077,102 | Fardon | Apr. 13, 1937 |
| 2,184,816 | Ross | Dec. 26, 1939 |
| 2,186,143 | Neugass | Jan. 9, 1940 |
| 2,240,402 | Joroslow | Apr. 29, 1941 |
| 2,247,258 | Shepard | June 24, 1941 |
| 2,457,042 | Hickman | Dec. 21, 1948 |